Patented Dec. 3, 1940

2,223,771

UNITED STATES PATENT OFFICE 2,223,771

COINING OF SODIUM DICHROMATE

Peter W. Uhl, Detroit, Mich., assignor to The Ecclestone Chemical Co., Inc., a corporation of Michigan No Drawing. Application September 30, 1939, Serial No. 297,315

3 Claims. (Cl. 23—245)

This invention relates to the coining of sodium dichromate and the like.

It is well known that sodium dichromate and normal chromates generally serve excellently as corrosion inhibitors for automobile radiators, automobile cooling systems and the like. Chromates in reaction with metals generally employed in automobile radiators, automobile cooling systems and the like deposit an insoluble coating on the metals thereof which is substantially impervious thus presenting on the surface of the metals means for preventing harmful acid solutions and other corrosion producing solutions from acting on the metals.

Heretofore, automobile manufacturers placed a corrosion inhibitor, preferably sodium dichromate, either in solution or in crystalline form, into the water in the cooling system of the automobile at the time the automobile is assembled. Chromates being poisonous, are harmful even in small quantities to the skin of men working on or about an automobile. Chromates are also extremely harmful and deleterious to the lacquer, enamel and paint used in the finish of motor vehicle bodies. When sodium dichromate in solution or sodium dichromate in crystalline form is placed in the radiator and cooling system of an automobile during the assembling operation, leakage from the cooling system or spillage from the careless placing of the sodium dichromate in the radiator drops upon workmen in pits below the vehicle assembly line and comes in contact with the hands of workmen performing assembling operations or adjustment operations on the automobile. The use of chromates as corrosion inhibitors in the form of sodium dichromate either in solution or in crystalline form has caused serious industrial labor and hospitalization problems for manufacturers. The majority of instances of skin burns from chromates have been traced to the careless placing of the chromates in the radiator of an automobile.

The deliquescence of sodium dichromate is so great that it is practically impossible to handle it without loss and great inconvenience in crystalline form where it is subjected to atmospheric conditions for a short period of time. Therefore, the use of sodium dichromate in solution is preferred by automobile manufacturers as a corrosion inhibitor for automobile radiators, the solution being added to the normal coolant water employed in an automobile radiator.

Also, a readily soluble chromate is often mixed with and added to anti-freeze solutions to make them non-corrosive. Anti-freeze solutions containing readily soluble chromates likewise injure the finish of automobile bodies when spilled thereon and are harmful to the hands of garage and service station attendants.

Therefore, attempts have been made to furnish sodium dichromate in freely soluble inexpensive coin, pellet or capsule form, all of which have met with failure because of the high deliquescence of the sodium dichromate, because of the hardening of a capsule by oxidation of the gelatin thereof, and because of the fact that the capsule, when dissolved, leaves in the cooling system of an automobile particles of gelatin which adhere to the surfaces of the metal parts thereof preventing portions of the surfaces of the metal parts from being corrosion-proofed by the solution of sodium dichromate coming in contact therewith. Also, organic binding materials such as starch and the like have been employed as binders for sodium dichromate and have been found impractical because of the starch and the like reducing the effectiveness of the chromate for the purpose for which it is employed, namely, a corrosion inhibitor.

The extremely high deliquescence of sodium dichromate causes pellets coined therefrom to absorb moisture from the atmosphere with such rapidity that a pellet of sodium dichromate will become so moist and squashy that the handling thereof is practically impossible within 6 to 24 hours after coining. The inherent deliquescence of sodium dichromate therefore obviously prevents pellets to be formed therefrom which are capable of commercial handling and convenient use if the pellets are subjected to the atmosphere for a short period of time after coining.

It has been found that sodium dichromate may be compressed or coined into pellets or blocks by mixing therewith prior to coining a suitable amount of soda ash as a binder and that the addition of the soda ash as a binder not only checks the deliquescence of the sodium dichromate to the extent that the coined pellets may be commercially handled and used without softening in the presence of atmosphere, but that the effectiveness of the sodium dichromate as a corrosion inhibitor is not lessened.

The solubility of the finished pellet comprising a mixture of sodium dichromate and soda ash was not materially decreased as compared with pellets composed of sodium dichromate without soda ash mixed therewith. The reactions taking place between sodium dichromate and soda ash in the pellet in the presence of atmosphere after coining does not hinder the pellet from being employed as a corrosion inhibitor or lessen to any practical degree the rate of solubility as compared to pure sodium dichromate pellets.

Coined pellets of sodium dichromate and soda ash were found to be commercially practical to handle, pack and ship in ordinary containers which keep them away from atmospheric exposure until used, and the pellets will not become soft, squashy and break down under reasonably long exposure to atmospheric moisture.

A series of tests show that when pellets are formed containing from 1 part of soda ash to 1 part of sodium dichromate up to 1 part of soda ash to 5 parts of sodium dichromate, that complete chemical change in the composition of the pellet does not occur until the pellets are dissolved. Pellets exposed to atmosphere for one month show signs of a reaction between the soda ash and the sodium dichromate but are still hard and perfectly capable of being handled commercially. With a proportion of 1 part of soda ash to 1.3 parts of sodium dichromate, a substantially complete chemical reaction to normal chromate will be effected in the pellet if exposed to atmosphere for a sufficient length of time or if dissolved in water.

When high ratios of sodium dichromate are used in a pellet there is not sufficient soda ash present to complete the reaction to a normal chromate upon long exposure to atmosphere or upon dissolving in water, however, this makes no difference since pellets of soda ash and sodium dichromate are completely soluble in water and sodium dichromate as well as normal chromates serve equally as well as corrosion inhibitors.

It has therefore been discovered that sodium dichromate can be used commercially in pellet form without softening due to the high deliquescence of the sodium dichromate if the pellets are formed with the addition of a suitable quantity of soda ash, the soda ash being a material which is not only harmless in reaction with sodium dichromate when used as a corrosion inhibitor in radiators but has the quality of improving the inhibitor by neutralizing excess acidity that may be in the dichromate solution used in the cooling system of the radiator. In other words, the soda ash tends to neutralize the acidity of the dichromate in solution whereby to make a more neutral and hence more desirable solution.

It is important to note that the sodium dichromate alone is highly deliquescent and cannot be coined and commercially used in pellet form without mixing therewith prior to coining a suitable quantity of soda ash and that the addition of the soda ash materially checks the absorption of moisture of the sodium dichromate and, at the same time, the presence of the soda ash does not perceptibly reduce the solubility of the pellet. Also, the mechanical combination of sodium dichromate and soda ash in the pellet has a simple gradual chemical reaction as moisture is taken on from exposure to atmosphere which gradually changes the sodium dichromate to sodium chromate which is equally effective as a corrosion inhibitor.

In order to make a pellet of mixed sodium dichromate and soda ash as effective as a pellet of sodium dichromate alone, the size of the pellet is increased by the amount of soda ash employed.

A mixture of 1 part of soda ash to 2 parts of sodium dichromate appears to be preferable and when coined under sufficient pressure, for example, 1000 to 4000 pounds per square inch, to form relatively hard pellets produces pellets which can be stored in air-tight cartons without apparent change for long periods of time and that when such pellets are subjected to ordinary atmospheric conditions they will not become soft within 30 days or more, however, the pellets will dissolve when placed in the coolant water of automobiles equally as readily as pellets coined of pure sodium dichromate. The pellets may be formed with varying mixtures of soda ash and sodium dichromate, for example, a mixture of from 1 part of soda ash to as high as 5 parts of sodium dichromate may be employed, and, after comparative tests, the mixtures containing a relatively large percentage of sodium dichromate show the advantageous characteristics outlined above. Although a pressure of 1000 to 4000 pounds per square inch has been found practical, it is not desired to limit the pressure under which the pellets may be coined.

The coining of sodium dichromate with suitable quantities of soda ash to make handling of the pellets possible after exposure to atmosphere eliminates the industrial hazards of the use of sodium dichromate as a corrosion inhibitor for automobile radiators and now makes sodium dichromate available in convenient pellet form for the use of automobile manufacturers, service stations and garages as a corrosion inhibitor.

Although the disclosure has been written with particular reference to the use of the pellets in the automobile industry, it is obvious that the coining of sodium dichromate opens its use as a rust inhibitor in other fields where its use was heretofore found unsatisfactory and inconvenient because of handling problems caused by the high deliquescence of the sodium dichromate.

Other deliquescent crystalline chemicals and salts may be coined by the teachings hereof where a deliquescence retarding admixture not incompatible with the deliquescent chemical is employed, provided, however, the characteristics of the deliquescent chemical for the purpose for which it is to be used are not altered by the mechanical and chemical union of the deliquescent chemical and the deliquescence retarding admixture employed.

Although but a single embodiment of the invention has been disclosed and described in detail, it is obvious that the invention is susceptible to many modifications and changes, and it is not intended to limit the scope thereof other than by the terms of the appended claims.

I claim:

1. As a new article of manufacture, a compressed pellet composed of a mixture consisting of 1 part of soda ash and 1 to 5 parts of sodium dichromate.

2. A dissolvable pellet to be added to water as a corrosion inhibitor comprising an intimate mixture consisting of 1 part of soda ash and 1 to 5 parts of sodium dichromate coined under pressure having the characteristic of equal or increased rate of solubility as compared to a like formed pellet of sodium dichromate.

3. The method of retarding the deliquescence of sodium dichromate pellets whereby to make the use of sodium dichromate in pellet form commercially practical and convenient to handle after exposure to atmosphere over long periods of time comprising the steps of intimately mixing with the sodium dichromate a sufficient quantity of soda ash to retard the deliquescence of the said sodium dichromate and compressing the said mixture into pellets.

PETER W. UHL.